United States Patent
Chodkowski

[11] Patent Number: 6,098,453
[45] Date of Patent: Aug. 8, 2000

[54] ELECTRIC WORN BRAKE PAD SELF-SENSING SYSTEM

[76] Inventor: Ray Chodkowski, 330 McWilliams Dr., Natrona Heights, Pa. 15065

[21] Appl. No.: 09/173,764
[22] Filed: Oct. 16, 1998
[51] Int. Cl.[7] .................................................. B60T 17/22
[52] U.S. Cl. ........................................... 73/121; 340/454
[58] Field of Search ..................... 73/121–129; 340/453, 340/454; 701/70, 29

[56] References Cited

U.S. PATENT DOCUMENTS

| | | | |
|---|---|---|---|
| 3,673,563 | 6/1972 | Thielen et al. | 73/129 |
| 3,740,566 | 6/1973 | Newstead | 340/52 A |
| 3,825,891 | 7/1974 | Kinast | 340/52 A |
| 3,869,695 | 3/1975 | Kita | 340/52 A |
| 3,882,448 | 5/1975 | Shibatani et al. | 340/52 A |
| 3,902,158 | 8/1975 | Dahlkvist | 340/52 A |
| 4,004,269 | 1/1977 | Arai et al. | 340/52 A |
| 4,117,451 | 9/1978 | Sato et al. | 340/52 A |
| 4,204,190 | 5/1980 | Wiley et al. | 340/52 A |
| 5,791,441 | 8/1998 | Matos et al. | 340/454 |

*Primary Examiner*—George Dombroske
*Attorney, Agent, or Firm*—Richard L. Huff

[57] ABSTRACT

A system for detecting worn brake linings contains sensors located at predetermined depths in the brake linings. Each brake has a corresponding lamp so a problem with a worn lining can be located. The system contains quick-release connections for each sensor, jumper wires for connecting the two sensors per wheel, resistors, diodes and lamps. The system is self-troubleshooting, and can determine the presence and location of worn brake linings, loose wires, open circuits, shorts, grounds, defective bulbs, and blown fuses. The determination of the presence and location of a problem is made through use of lamps which may be off, glowing at half brilliance, or glowing at full brilliance under specified conditions. When the ignition is off, all the bulbs are off. When the ignition is "on", all the bulbs glow at half brilliance if there are no problems. If all the bulbs are out, it is indicative of a power failure. If individual bulbs are out, it is indicative of a defective bulb or an "open" condition in an individual wheel. If one bulb is glowing at full brilliance, it is indicative of a short or ground in the corresponding wheel. When the ignition is in the "run" position, no lamps should be on. If a lamp lights when the brake pedal is depressed, that indicates a worn brake lining in the corresponding wheel. The system is inexpensive, easy to install, and draws no, or minimal, current in operation.

5 Claims, 4 Drawing Sheets

ELECTRIC WORN BRAKE PAD SELF-SENSING SYSTEM

BACKGROUND OF THE INVENTION

1. Field of the Invention

This invention is directed to a system for indicating wear in vehicle brakes. The system indicates which brakes are worn and troubleshoots itself to indicate if any problems exist in the system.

2. Description of the Related Art

Indicators to sense and report brake lining wear are known in the art. U.S. Pat. Nos. 2,217,176 to Madison; U.S. Pat. No. 3,649,959 to Sakata; U.S. Pat. No. 3,689,880 to McKee et al, U.S. Pat. No. 3,958,445 to Howard et al; U.S. Pat. No. 4,387,789 to Borugian (the most closely related prior art known to the inventor); U.S. Pat. No. 4,606,434 to Vasiilow et al; U.S. Pat. No. 5,403,072 to Kilian et al; and U.S. Pat. No. 5,559,286 to White et al all disclose electrical conductive sensors imbedded in the brake lining of a brake system. These sensors close a circuit when the brake lining wears down to such an extent that the brake drum contacts the sensor, and the closed circuit provides an indication to the vehicle operator that the brake lining has been worn down to a predetermined degree.

These systems allow the operator to be aware of brake lining wearing before the rivets or the metal backing plate holding the linings can damage the brake drum. Thus, brake linings can be replaced before they are dangerously worn or damage is caused to the brake drum.

The prior art systems have drawbacks, however. They do not isolate the problem by indicating which brake is worn. Some of the systems are complex and use expensive parts and parts which are likely to break. Each of the prior art systems known to the inventor may give false positive readings or may fail to give positive readings due to broken connections.

SUMMARY OF THE INVENTION

The system of this invention seeks to maintain the beneficial features of the prior art devices while solving the problems which are inherent in these systems. The system of the present invention alerts the operator to the condition wherein a brake lining is worn to a predetermined depth. The particular brake lining is identified. Also, each lining has a designated light so that the condition of each lining may be determined and isolated. The system provides an automatic self-troubleshooting process which ensures that no false positive readings are given and informs the operator of any problems which would prevent the system from giving a positive reading in the event the brake lining wears to the predetermined point. An added benefit of the system of the present invention is that it draws no power except when self-testing or when an actual malfunction occurs. The invention will now be described fully by the following drawings and accompanying description.

DESCRIPTION OF THE PREFERRED EMBODIMENTS

The invention will now be described with reference to the above drawing, like numerals referring to like features throughout.

Figure 1:
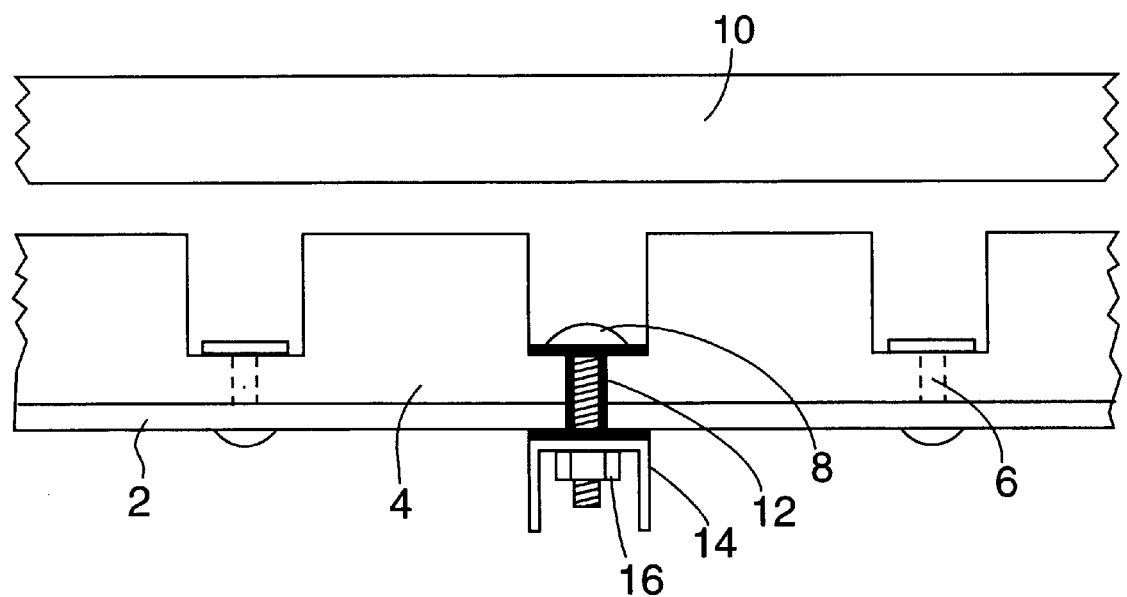
FIG. 1 is a enlarged drawing of the relationship between the brake drum, brake lining, sensor, and electrical connection.

Referring to FIG. 1, the present invention is useful with a brake shoe or backing plate 2 and brake lining 4 which are conventionally used on automobiles, trucks, tractors, etc. The brake lining 4 is conventionally held to the backing plate 2 by rivets 6. A sensor 8 is so arranged that as the brake lining 4 wears down, the sensor 8 will contact the brake drum 10 at a predetermined level of wear. This predetermined level is prior to the level wherein the brake drum 10 would contact, and be damaged by, the rivets 6 or the metal backing plate 2. To avoid damage to the brake drum 10 by the sensor 8, the sensor 8 is conveniently made of a soft, electrically conductive material. Brass is the preferred material because of its ready availability and low cost. Ceramic insulating bushings 12 surround the sensor 8 to prevent undesirable electrical shorts. Two-lug male quick-disconnect devices 14 are held in place on the sensors 8 by brass nuts 16, creating an electrical conducting unit.

Figure 2:
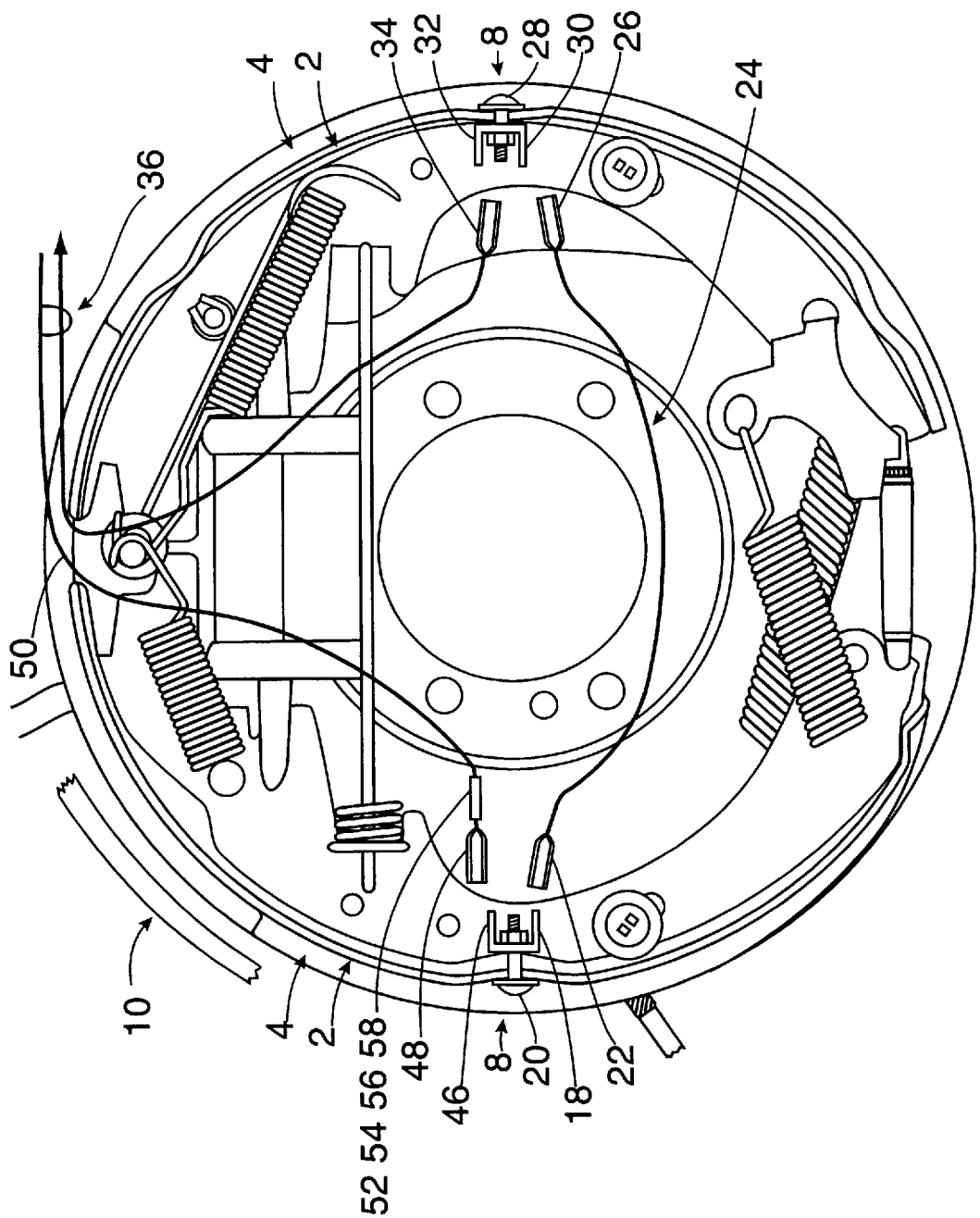
FIG. 2 is a side elevational view of a vehicular brake system showing the sensors and electrical connections of the present invention.
Figure 3:
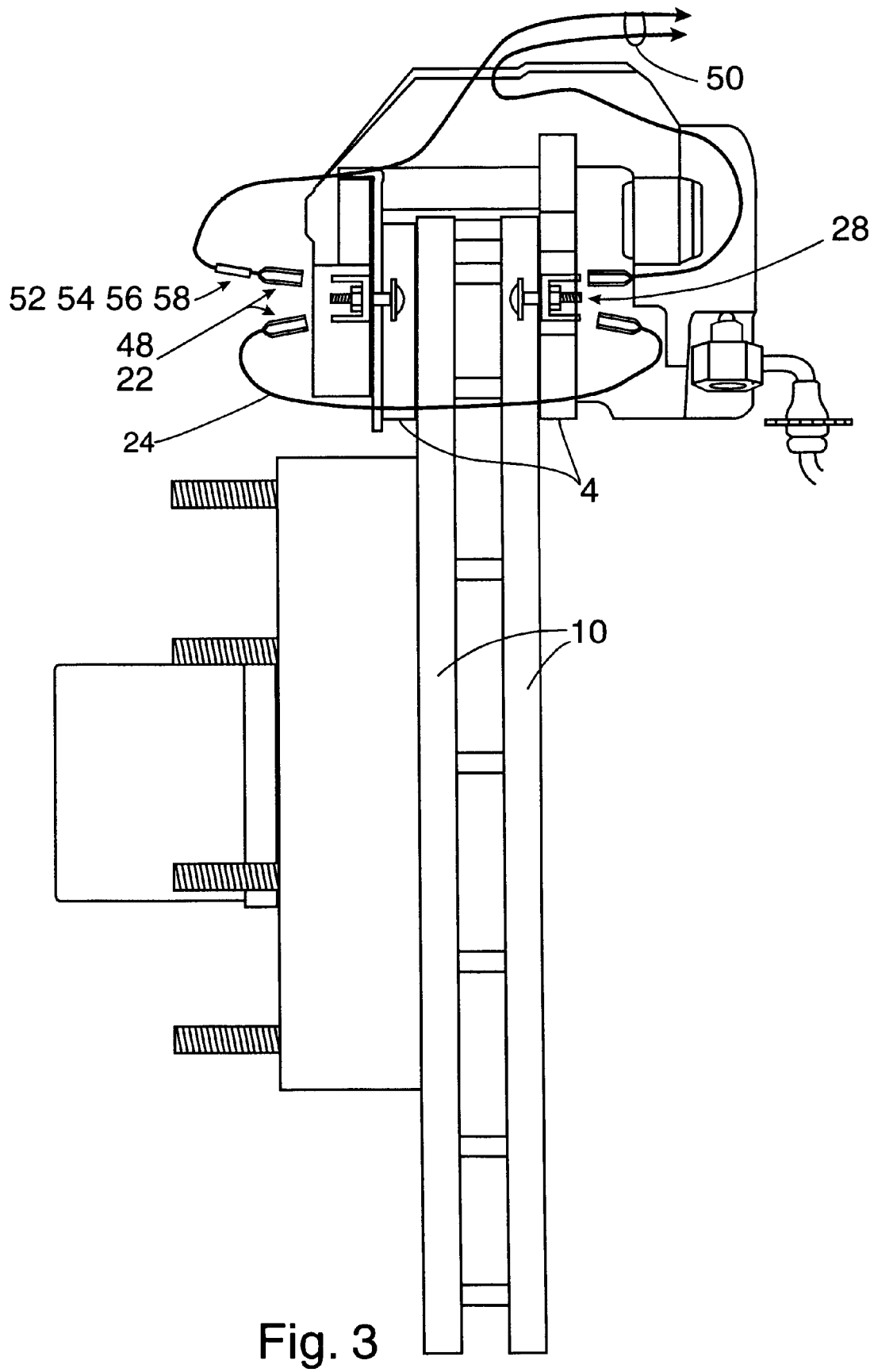
FIG. 3 is a front elevational view of a vehicular brake system showing the sensors and electrical connections of the present invention.

Referring to FIGS. 2 and 3, preferably, there are a plurality of sensors 8 for any one wheel. Most preferably, there are two sensors 8, and this invention will be described using this preferred number. A first, male quick-disconnect lug 18 of a first sensor 20 is connected to a first, female quick-disconnect receptacle 22 which is attached by an insulated jumper wire 24 to a first, female quick-disconnect receptacle 26 of a second sensor 28. This first, female quick-disconnect receptacle 26 is attached to a first, male quick-disconnect lug 30 of the second sensor 28. A second, male quick-disconnect lug 32 of the second sensor 28 is attached to a second, female quick-disconnect receptacle 34 which is connected to a second insulated wire 36 which exits the braking device and passes to the corresponding lamp 38 40 42 44 shown in FIG. 4. A second, male quick disconnect lug 46 of the first sensor 20 is connected to a second, female quick-disconnect receptacle 48, which is attached to a first insulated wire 50 containing a resistor 52 54 56 58. This wire 50, exits the braking device along with the other insulated wire 36, and passes through the corresponding diode 60 62 64 66 shown in FIG. 4.

Figure 4:
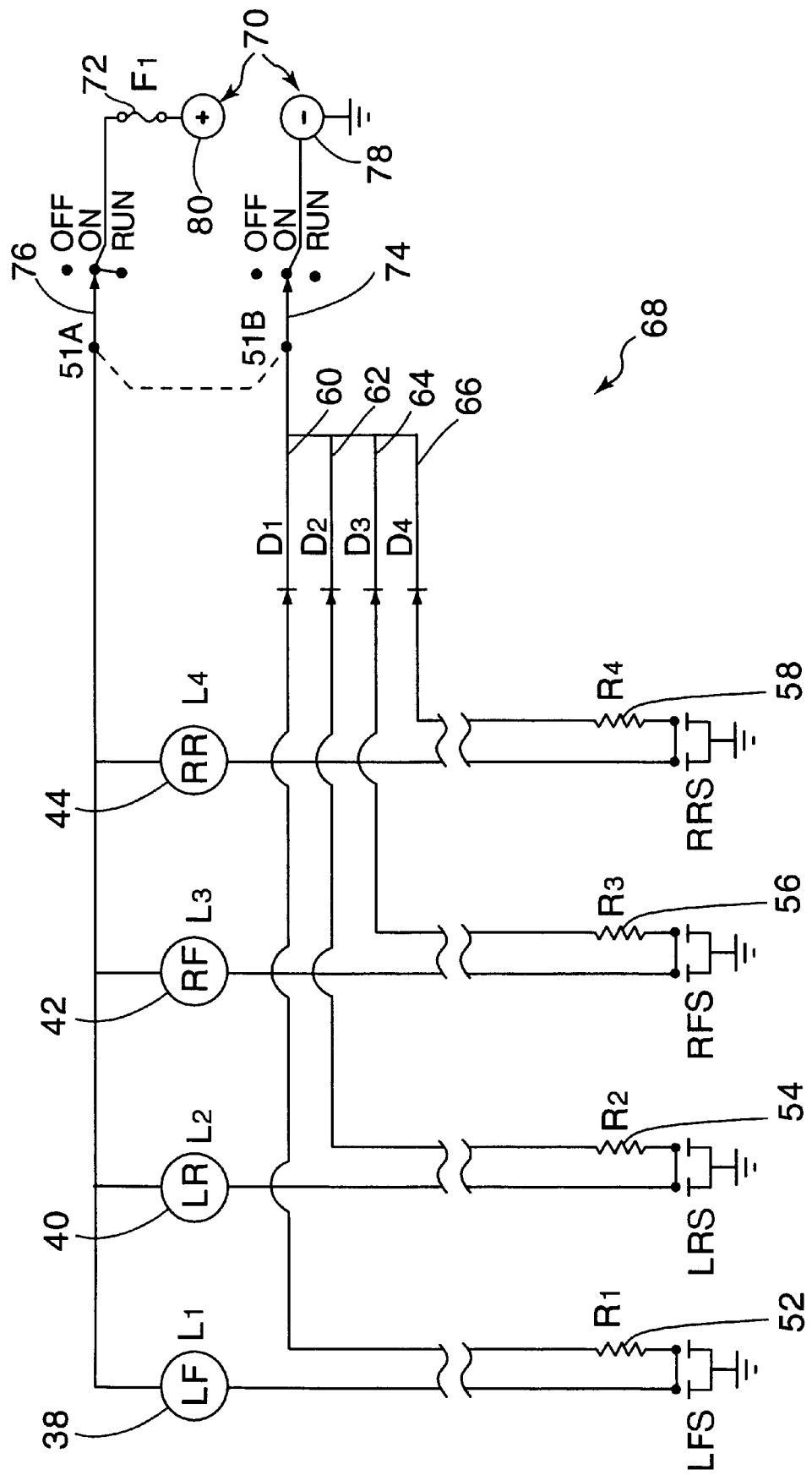
FIG. 4 is a schematic drawing of the electrical system of the present invention.

Referring to FIG. 4, the electrical system 68 is identical for each brake, and where possible, the description of a single brake will be described for simplicity.

The system 68 of this invention uses the existing battery 70 and fused 72 ignition switch 74 76 (shown here as ganged) in the vehicle, incorporating a self-testing feature every time the ignition switch 74 76 is turned to the "on" position. The system 68 of this invention also functions when the ignition switch 74 76 is turned to the "run" position. The indicator lamps 38 40 42 44 of the system 68 may be out, glowing at half brilliance, or glowing at full brilliance. Each of these conditions has its own meaning depending on the circumstances which will be described below. The system 68 differentiates between abnormalities such as loose wires, open circuits, shorts, grounds, defective bulbs, and blown fuses. In addition to sensing the abnormal condition, the system 68 also isolates the wheel that has the problem. The several possibilities will now be described.

When the ignition switch 74 76 is turned to the "off" position, the complete system is off.

When the ignition switch 74 76 is turned to the "on" position, the current flow is from the negative terminal 78 of the battery through the "on" switch (SIB) 74, through steering diodes ($D_1D_2D_3D_4$) 60 62 64 66, through limiting resistors ($R_1R_2R_3R_4$) 52 54 56 58, through indicator lamps ($L_1L_2L_3L_4$) 38 40 42 44, through the "on" switch (SIA) 76, through an existing fused 72 circuit to the positive terminal 80 of the battery 70.

The resistors ($R_1R_2R_3R_4$) 52 54 56 58 limit the current through the indicator lamps ($L_1L_2L_3L_4$) 38 40 42 44 to half capacity. Thus, all of the bulbs normally glow to half brilliance when the ignition switch 74 76 is in the "on" position and the system 68 has no faults. If all of the bulbs are out, it is indicative of a power failure. If one bulb is out, it indicates either that the bulb is defective or there is an "open" condition in the wiring to that particular wheel. If one bulb is glowing at full brilliance, it is an indication that there is a short or grounded condition relative to the wiring that pertains to that particular wheel circuit.

When the ignition switch 74 76 is turned to the "run" position, power is maintained to the system 68 through switch SIA 76 while the negative voltage or ground condition is isolated from the circuit through SIB 74. Thus, when the vehicle is being driven, no lights in this system are on and no power is being used by this system.

When the ignition switch 74 76 is turned to the "run" position, and when the brake lining 4 wears to a point where the brake drum 10 makes contact with the sensor 8 when the foot brake is depressed, the drum 10 acts a ground for the electrical circuit. This causes electricity to flow through the insulated wires to be grounded on the drum 10. The insulated wire 50 containing a resistor 52 54 56 58 passes to a diode 60 62 64 66. The wire 36 not containing a resistor 52 54 56 58 passes to an indicator lamp 38 40 42 44. In this condition the bulb associated with that particular wheel is lit. Because the resistor 52 54 56 58 is no longer in the remaining circuit, the bulb lights to its full brilliance, i.e., twice as bright as it is in the "test" position. The bulb lights to a full brilliance each time the brake pedal is depressed, calling attention to the operator that a particular brake lining 4 is worn and is in need of attention.

When the ignition switch 74 76 is in the "run" position and the brake is not depressed, if a lamp 38 40 42 44 glows to its full brilliance, that is an indication of a short or ground condition in the wiring from the ignition switch 74 76 to the wheel indicated by the lamp 38 40 42 44. As can be seen the system 68 is capable of troubleshooting itself and identifying which wheel has a problem and giving an indication as to the nature of the problem. The system 68 drains a minimum amount of current when the ignition switch 74 76 is on and none when the ignition switch 74 76 is off.

Preferably, the bulbs used in the system 68 are 12 volt bulbs drawing a maximum of 60 mamps. The resistor 52 54 56 58 is a 200 Ohm, ½ Watt resistor which is adequate to alter the brilliance of the bulb to one half. The diodes 60 62 64 66 (Radio Shack type IN914 SKU #276–1620) have the function of keeping current from flowing in a reverse direction, and are thus called steering diodes. The active current under an alarm condition is only 60 mamps and only for the time that the brake pedal is depressed. The sensor 8 is preferably a ¼×20 brass round head bolt secured by a ¼×20 brass nut 16 and is approximately ¾ inch in length. A 2-lug male quick-disconnect device 14 is attached to the sensor 8 on each brake lining. Each lining 4 is connected in its corresponding wheel with a jumper wire 24 having quick-disconnect female receptacles 22 26.

It is critical that the sensor 8 be electrically isolated from ground when the brake lining 4 is not worn. When a semi-metallic lining 4 is used, the sensor 8 can be insulated from the lining 4 by use of steatite ceramic bushings 12. A pair of wires 36 50 coming from the dashboard goes to each wheel. One of the wires 50 in each pair will have one of the limiting resistors 52 54 56 58 just prior to being terminated with the female quick-disconnect receptacle 48. The other wire 36 in the pair is terminated with a female quick-disconnect receptacle 34 that mates to the remaining lug 32.

When this just-described arrangement exists and the ignition switch 74 76 is in the "on" or "test" position and a bulb does not light, there is an "open" condition which is an indication that one of the connections has come loose and has fallen off. Thus, repairs can be readily made.

When replacing brake linings 4, the only additional service that is required is the disconnecting of the quick-disconnects devices 14. The rest of the circuitry of the system remains intact and needs no further attention.

Although this invention has been described and illustrated in detail, it is to be clearly understood that the same is by way of illustration and example, and is not to be taken by way of limitation. The spirit and scope of the present invention are to be limited only by the terms of the appended claims.

I claim:

1. A system for detecting worn brake linings in a vehicle containing wheels, an ignition switch, and a battery, which battery contains a positive and a negative terminal, comprising:

(A) for each wheel containing brakes, a braking device comprising:

(I) brake drums;

(II) brake backing plates;

(III) brake linings bonded to the brake backing plates or connected by rivets; wherein:

a) each brake lining contains a sensor which is placed at a predetermined level such that as the brake drum wears the brake lining, the brake drum will contact the sensor prior to contacting the rivets; or metal backing plate;

b) each sensor is electrically insulated from the brake lining and the backing plate by an insulating bushing;

c) each sensor is electrically connected to a two-lug male quick-disconnect device and d) each sensor is serially electrically connected to each other sensor in the braking device; and (IV) two connecting wires which exit the braking device, wherein:

a) the first wire connects a first sensor to the negative terminal of the battery through a resistor, a diode, and the ignition switch and b) the second wire connects a second sensor to the positive terminal of the battery through a lamp and the ignition switch.

2. The system of claim 1, wherein the characteristics of the resistor are such that current passing through the resistor will cause the lamp to glow at approximately one half of its normal brilliance.

3. The system of claim 2, wherein each braking device contains a first sensor and a second sensor;

i) the first lug of the two-lug male quick-disconnect device of the first sensor being connected to a first female receptacle which leads to a jumper wire, a first female receptacle of a second sensor, a first lug of the two-lug male quick-disconnect device of the second sensor, a second male quick-disconnect lug of the second sensor, a second female receptacle, and a second wire which exits the braking device and ii) the second lug of the male quick-disconnect device of the first sensor being connected to a second female receptacle which is attached to a first wire containing a resistor and which exits the braking device.

4. A system for detecting worn brake linings in a vehicle containing wheels, an ignition switch, and a battery, which battery contains a positive and a negative terminal, comprising, for each wheel:

A. a braking device comprising electrically connected insulated sensors;

B. a first wire, from the first sensor, exiting the braking device and being connected to the negative terminal of the battery through a resistor, a diode and the ignition switch; and C. a second wire, from the second sensor, exiting the braking device and being connected to the positive terminal of the battery through a lamp and the ignition switch.

5. The system of claim 4, wherein the characteristics of the resistor are such that current passing through the resistor will cause the lamp to glow at approximately one half of its normal brilliance.

* * * * *